United States Patent [19]

Rongved

[11] 4,269,709
[45] May 26, 1981

[54] WASTE WATER TREATMENT SYSTEM WITH AERATION AND CIRCULATION MEANS

[76] Inventor: Paul I. Rongved, Notch Rd., Oak Ridge, N.J. 07438

[21] Appl. No.: 64,033

[22] Filed: Aug. 6, 1979

Related U.S. Application Data

[63] Continuation of Ser. No. 884,746, Mar. 9, 1978, abandoned.

[51] Int. Cl.³ ............................ C02F 3/18; C02F 1/74
[52] U.S. Cl. .................................. 210/195.3; 210/219; 210/926
[58] Field of Search ............... 210/7, 14, 15, 60, 63 R, 210/194, 195.1, 219, 220, 242 A, 195.3, 195.4, 197

[56] References Cited

U.S. PATENT DOCUMENTS

| | | | |
|---|---|---|---|
| 3,473,790 | 10/1969 | Auler et al. ....................... | 210/219 X |
| 3,510,110 | 5/1970 | Klein ................................... | 210/220 |
| 3,900,394 | 8/1975 | Rongved ............................. | 210/7 |
| 3,977,965 | 8/1976 | Tholander et al. ................ | 210/14 X |
| 3,990,974 | 11/1976 | Sullins .............................. | 210/220 X |
| 4,080,292 | 3/1978 | Przybylowicz et al. ........... | 210/219 |
| 4,081,368 | 3/1978 | Block et al. ....................... | 210/7 X |

FOREIGN PATENT DOCUMENTS

| | | | |
|---|---|---|---|
| 2353316 | 6/1975 | Fed. Rep. of Germany ............. | 210/14 |
| 2505898 | 8/1975 | Fed. Rep. of Germany ........... | 210/220 |
| 2636221 | 3/1977 | Fed. Rep. of Germany ........... | 210/219 |
| 2095096 | 2/1972 | France ..................................... | 210/194 |
| 7606196 | 12/1976 | Netherlands ............................ | 210/219 |

OTHER PUBLICATIONS

Walker, "Rotor Aeration of Oxidation Ditches", 6/1962, Water & Sewage Works, pp. 238-241.

*Primary Examiner*—Robert H. Spitzer
*Attorney, Agent, or Firm*—Samson B. Leavitt; Michael A. Leavitt

[57] ABSTRACT

A flowing liquid system in which means are provided for simultaneously aerating and circulating said liquid comprising surface aerator means cooperating with partition means extending into a communication section between a first channel and a second channel with the aerator means located on the second channel side of and separated from the partition means and closer to the partition means than to the outside of the communication section, said system being particularly suited for use in an activated sludge waste water treatment system.

13 Claims, 7 Drawing Figures

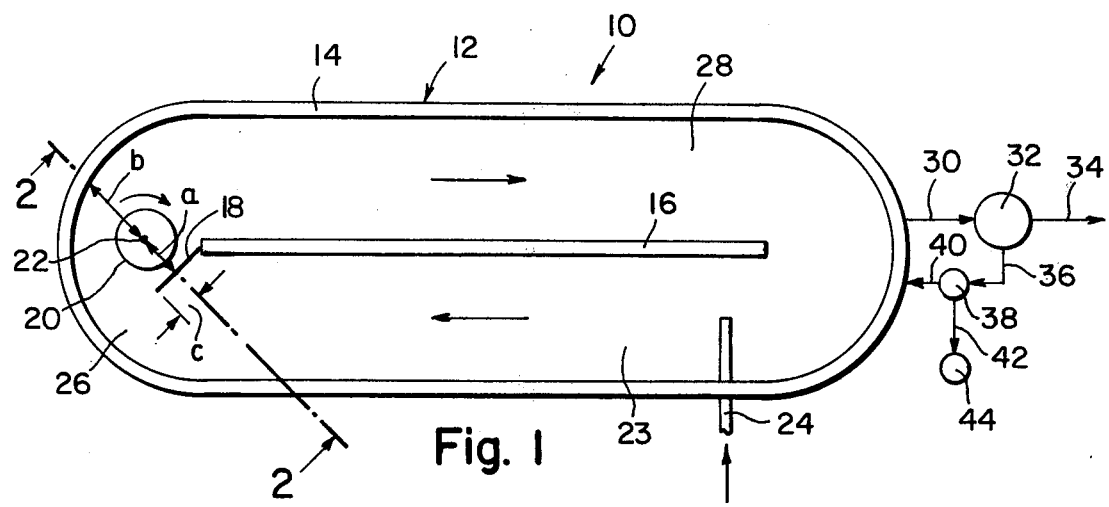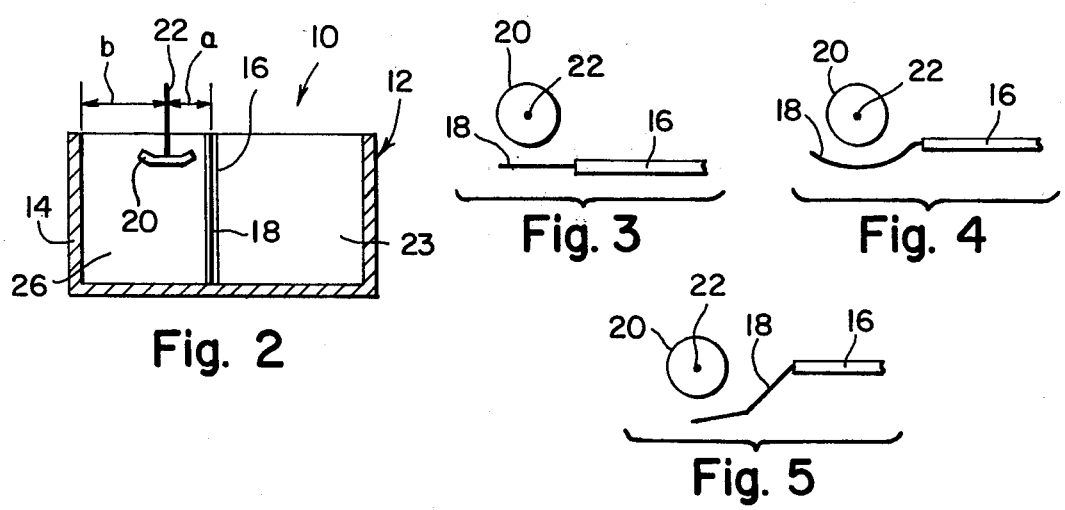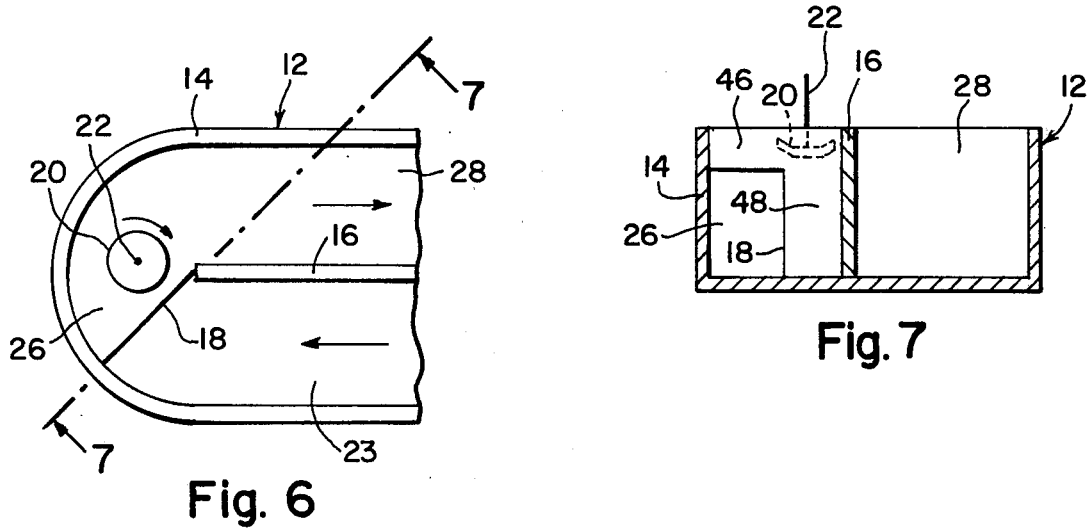

WASTE WATER TREATMENT SYSTEM WITH AERATION AND CIRCULATION MEANS

This is a continuation of application Ser. No. 384,746 filed Mar. 9, 1978, now abandoned.

This invention relates to a flowing liquid system and more particularly to such a system provided with novel means for simultaneously aerating, mixing and circulating the liquid at predetermined rates for optimum process rates.

This invention is hereinafter specifically described with respect to its preferred embodiment comprising an activated sludge waste water treatment system. It will, however, be understood that the fundamental features of this invention may be employed in other embodiments comprising liquid systems in which aerating and circulating means are utilized.

An effective activated sludge treatment process is one of the best and most widely used of the waste water treatment processes. It utilizes bacterial decomposition for the removal of organic matter in the waste water. After an initial screening or gravitational settling period has removed any large and/or heavy material in the waste water, such waste water is introduced into chemical and/or biological reaction to occur, whereby the colloidal material forms sludge flocs. Bacteria and other microorganisms colonize such sludge flocs and grow and reproduce. The sludge flocs should remain suspended in the reactor but should settle readily in a clarifier (settling tank) from which all or a portion can be easily returned to the reservoir while purified water is drawn off. A sludge floc can typically achieve an average age of 30 to 40 days and carries strong, well-developed bacteria and micro-organisms which are active in converting the organic matter in the waste water into products which are environmentally harmless or easily precipitated or otherwise removed. This "activated sludge" is maintained in the reactor by returning to the reactor at least a portion of the sludge recovered from the underflow of the clarifier. The separation and recirculation of the activated sludge to the reactor for further aeration with the waste water results in the continuous purification of the waste water and causes the treated liquid output from the overflow of the clarifier to be substantially purified.

Activated sludge treatment plants have as indicated been constructed and have been found to function more or less successfully. However, certain design criteria have been established in the operation of these plants and must be incorporated in any design for efficient operation. It has been found, for example, that the rate of flow of the waste water in the reactor must be maintained at a minimum of 0.8 to 1.0 feet per second in order to prevent the sludge from settling in, that it takes from 8 to 12 minutes for the bacteria and other microorganisms to use up substantially all the dissolved oxygen in the waste water. Energy efficiency considerations, therefore, require that the waste water be subjected to aeration no more often than approximately once every 8 to 12 minutes.

Most activated sludge treatment processes which have been disclosed produce a treated liquid output which contains an undesirably high level of nitrate contamination. In my U.S. Pat. No. 3,900,394, the entire disclosure of which is herein incorporated by reference, I have disclosed an improved and more efficient continuous activated sludge sewage treatment process comprising, in continuous manner, injecting raw sewage liquid into a reactor providing a single horizontal closed loop path, circulating the liquid around said path at a speed of at least about 0.8 feet per second and sufficient to avoid substantial settling of sludge suspended therein, aerating the liquid in said path to promote aerobic decomposition of the sewage and formation of nitrate compounds in said liquid, circulating the aerated liquid around said path for a first distance in which said decomposition proceeds until the liquid is substantially devoid of oxygen at the point of raw sewage injection, circulating the liquid containing nitrate compounds and raw sewage around said path for a second distance in which denitrification proceeds in said liquid until it reaches the next point of aeration in said path, continuously removing treated liquid, for clarification and settling of sludge therein, at a rate approximating the rate of injection of the raw sewage liquid, discharging the resulting settled sludge of the liquid in said reservoir, the average retention time of the liquid in the reservoir being at least about 24 hours, said second distance being at least about 10% of the sum of said first and second distances.

The need for relatively large land areas dictated by the two-fold criteria of a rate of flow of at least 0.8 to 1.0 feet per second and an interval 8 to 12 minutes between aerations resulting in a minimum path length for the reactor of at least 480 feet between aerations is a disadvantage for many locations where land is not available or is at a premium. In my copending Application Ser. No. 734,315 filled Oct. 20, 1976, now U.S. Pat. No. 4,146,478, the entire disclosure of which is hereby incorporated by reference, I have disclosed and claimed a system which requires relatively smaller land areas, said system including a continuous waste water treatment system comprising a reactor providing a single, closed, continuous, substantially horizontal path through at least two adjacent substantially concentric loops, each of said loops having a beginning and an end, said reactor being provided with waste water inlet means, treated liquid outlet means, and aeration and circulation means, and wherein said treated liquid outlet means is connected to clarifying means which removes at least some of the sludge carried by the treated liquid and sludge return means is provided to return at least some of the removed sludge to said reactor.

U.S. Pat. No. 3,510,110 discloses means whereby a surface aerator may be used in an activated sludge closed circuit waste water treatment system, according to which the oxygen required for the aeration is added by means of a surface aerator rotating about a vertical axis in mandatory association with a partition situated in the vicinity of said surface aerator and substantially closing off said circuit on one side of said surface aerator. However, I have found that the juxtaposition of the rotating aerator with the partition, required to close off said circuit on one side of said surface areator, results in excessive turbulence at the sites where the circulating liquid impacts on the partition. This turbulence destroys many flocs, the existence and growth of which are an essential part of the activated sludge process as described above. Furthermore, the propulsion force for moving the liquid in the circuit is not efficient since the horizontal force from the aerator means into the second channel is partly counteracted by its horizontal force into the first channel and by the interfering juxtaposed partition.

It is an object of this invention to provide a system which will not be subject to one or more of the above disadvantages.

Another object of the invention is the provision of such a system comprising aeration and circulation means which avoid or substantially reduce the amount of floc destruction referred to above. Yet another object of the invention is the provision of improved and/or more efficient aerating and circulating means for use in a horizontally disposed flowing liquid system, when a high degree of aeration is required together with a strong propulsion force to move the liquid horizontally at the required speed in the circuit as for example in activated sludge waste water treatment systems, and especially in such systems as mentioned above where long distances are required between points of aeration in the circuit and wherein the circuit path is often curved. Other objects and advantages will appear as the description proceeds.

The attainment of one or more of the above objects is made possible by this invention which includes, in a horizontally disposed flowing liquid system in which the liquid changes flow direction from a first channel through a communication section into a second channel, means for simultaneously aerating and circulating said liquid comprising substantially vertical partition means cooperating with surface aerator means, said partition means extending from the inside wall of said first channel into said communication section and said surface aerator means rotating about a substantially vertical axis on the second channel side of said partition means, said axis of said surface aerator means being separated from said partition means at the closest point by a distance corresponding to about 1½ to 2 radii of said surface areator means and an outer edge of said partition means extending past said closest point no more than a distance corresponding to about 1 said radius, said axis being separated from the outside wall of said communication section by a distance corresponding to more than 2 said radii.

The above brief description, as well as further objects, features and advantages of the present invention, will be more fully appreciated by reference to the following detailed description of presently preferred, the nonetheless only illustrative, embodiments in accordance with the present invention, when taken in conjunction with the accompanying drawings, in which:

FIG. 1 is a plan view of one preferred embodiment of this invention.

FIG. 2 is a sectional view taken along the line 2—2 of the embodiment of FIG. 1.

FIGS. 3, 4 and 5 are plan views of other embodiments comprising aerator and partition means configurations alternative to that shown in FIG. 1.

FIG. 6 is a partial plan view of still another embodiment comprising an aerator and partition means configuration alternative to that shown in FIG. 1.

FIG. 7 is a sectional view taken along the line 7—7 of FIG. 6.

Referring now to FIGS. 1 and 2, reference numeral 10 indicates generally an apparatus embodying my invention comprising reservoir or reactor 12 which includes outside wall 14, inside wall 16, partition means 18 and surface aerator means 20 with substantially vertical axis or shaft means 22. Waste water to be treated enters a first channel 23 in reactor 12 through inlet means 24 and flows past partition means 18 into communication section 26 wherein surface aerator means 20 cooperating with partition means 18 simultaneously aerates and by a unique centrifugal pumping action impels the waste water into a second channel 28. Treated liquid outlet means 30, such as an overflow pipe, is provided which removes treated liquid to a clarifying means 32 in the form of a settling tank. Clarifying means 32 is provided with outlet pipe 34 for removing purified water (effluent) from the system, and sludge pipe 36 which leads to sludge pump 38 is connected by sludge return pipe 40 back to reactor 12 and by pipe 42 to excess sludge tank 44.

Surface aerator means 20, of known configuration, is positioned in communication section 26 in such a manner that axis 22 is separated from partition means 18 by a distance "a" corresponding to about 1½ to 2 radii of said surface aerator means 20. The dimensions of communication section 26 and the diameter of surface aerator means 20 are so selected that axis 22 is separated from the outside wall of said communication section 26 by a distance "b" corresponding to more than 2 radii of said surface aerator means 20. Further, the dimensions of partition means 18, the diameter of surface aerator means 20, and the positioning of axis 22 are selected in such manner that partition means 18 extends beyond its closest point to axis 22 by a distance "c" corresponding to no more than one radius of surface aerator means 20. These requirements determine that the tips of the impeller blades of surface aerator means 20 are separated from partition means 18, at their closest approach, by a distance corresponding to about ½ to 1 radius of surface aerator means 20 while remaining separated from the outside wall of communication section 26 by a distance corresponding to more than 1½ said radii. Also, partition means 18 extends past the point of closest approach of said blade tips by no more than 1 said radius, or alternatively stated, partition means 18 does not extend beyond the tips of the blades of surface aerator means 20.

The dimensions, relative positions, and structures described in the preceding paragraph have been found to be critical and essential for achieving objects of this invention by enabling a relative reduction in the degree of floc-destroying turbulence, a relative increase in the efficiency of the propulsion forces necessary to move the liquid in the circuit, and/or a relative increase in the efficiency of aeration of the liquid in the circuit. Aeration is accomplished by the rotation of surface aerator means 20 impelling the upper layer of liquid centrifugally and tangentially away from the aerator which causes a mixing with the air above. The liquid flows downwardly at the outside wall 14 and partition means 18 and returns to the aerator from below. According to this invention, and particularly by reason of the tangential and space relationship between the surface aerator means and the partition means, the liquid is caused and permitted to circulate around the aerator many times with minimal turbulence, thereby minimizing the floc-destruction and increasing the centrifugal forces thus enabling an increase in the efficiency of the propulsion forces necessary to move the liquid in the circuit. Typically, the surface aerator means has four impeller blades which rotate at a tip speed of at least 15 times the speed of flow of the liquid in the reservoir, but not at so high a speed as would cause destruction of the flocs.

According to another feature of this invention, a further relative reduction in the degree of flow-destroying turbulence, a further relative increase in the efficiency of said propulsion forces, and/or a further relative increase in the efficiency of aeration may be obtained by tilting the shaft means of the surface aerator means from the vertical so that the plane in which the aerator impeller means rotates is non-horizontal. For the attainment of optimum results it is preferred that the aforementioned tilt be such that said plane slopes up and away from said partition means at an angle of up to 10° from the horizontal, and preferably from 2° to 4°.

It will be noted that in the embodiment shown in FIGS. 1 and 2 the partition means 18 is uniplanar and extends from inside wall 16 at an angle in the direction of outer wall 14 of first channel 23 whereby the flow of the liquid in the reservoir is deflected laterally while simultaneously being accelerated due to the narrowing of channel 23 at the entrance of communication section 26. This deflection and increase in speed of the flow of liquid aids the desired novel centrifugal pumping action of the surface aerator means while still further reducing destructive turbulence. As described above, surface aerator means 20 impels the upper layer of liquid centrifugally and tangentially away therefrom. This action causes the liquid at the surface to move with a generally clockwise and outward motion, assuming the various motions are in the directions indicated by the arrows in FIG. 1. The generally clockwise direction of flow is maintained when the liquid reaches outside wall 14 and partition means 18, but the outward component of the motion is changed to a downward direction. When the clockwise and downwardly flowing liquid reaches the bottom of communication section 26 the downward component of motion changes to an inward motion and then to an upward motion under surface aerator means 20. Careful consideration of FIG. 1 in view of the above description of the motion of the liquid clearly illustrates the manner in which the relative positioning of the surface aerator means and the partition means of my invention functions to reduce destructive turbulence. It is apparent that the directions of liquid flow on both sides of partition means 18 are parallel so that minimum turbulence is created when the two flows merge at the end of partition means 18. Further, the narrowing of channel 23 at the entrance of communication section 26 increases the rate of flow of liquid in that portion of reservoir 12 and thereby decreases the difference in rate of flow between the two flows, which also acts to reduce destructive turbulence. Still further, the lateral deflection of the incoming flow toward outside wall 14 causes the flow to follow the surface of outside wall 14 (which is curved as shown but which may instead be composed of a plurality of segmented substantially vertical planar sections) in communication section 26 and thereby merge with the flow around surface aerator means 20 at a relatively greater distance from surface aerator means 20 where the rate of flow is slower, which acts to reduce turbulence even further. This reduction in turbulence allows the liquid to carry more energy from the surface aerator means in the form of rotational motion than would be possible in the presence of increased energy wasting turbulence, and this increase in energy in the form of rotational motion increases the centrifugal pumping action of surface aerator means 20. An additional benefit of my invention becomes apparent when it is noted that the spacing of surface areator means 20 from partition means 18 allows a greater quantity of liquid to participate in the rotational motion than would be possible if partition means 18 substantially closed off one side of the circuit for flowing liquid. Again, this increased quantity of flowing liquid increasing the pumping action of my invention over certain known arrangements.

FIG. 3 illustrates another embodiment of this invention comprising a configuration of surface aerator means 20 and partition means 18 alternative to the arrangement shown in FIGS. 1 and 2. In this embodiment the partition means 18 comprises an extension of inside wall 16 in the same plane, and may in fact be integral therewith, thereby being obviously advantageous economically. However, this embodiment does not involve the narrowing of channel 23 at the entrance to communication section 26 and the resulting increased rate of flow of the liquid creating venturi effect in the embodiment of FIGS. 1 and 2.

FIG. 4 illustrates still another embodiment of this invention in which partition means 18 is arcuate, and preferably curves first in the direction of outer wall 14 and then in the direction of inner wall 16 (or back towards surface aerator means 20). Arcuate partition means 18 in this embodiment achieves an even greater reduction in turbulence over the uniplanar partition means of the embodiment of FIGS. 1 and 2 since the curved surfaces direct the flow of liquid even more smoothly, but at the cost of increased difficulty and expense of construction.

FIG. 5 illustrates yet another embodiment of my invention comprising a configuration of surface aerator means 20 and partition means 18 alternative to the arrangements shown in FIGS. 1 to 4. Partition means 18, in this embodiment, comprises planar segments lying in at least two different planes, preferably with the first segment defining a greater angle with inside wall 16 than the angle defined by the second segment and inside wall 16. This embodiment represents an intermediate arrangement between the uniplanar partition means of FIGS. 1 and 2 and the arcuate partition means of FIG. 4, and is also intermediate in both the discussed advantages and disadvantages.

FIGS. 6 and 7 illustrate a further embodiment of my invention wherein partition means 18 comprises a separation wall consisting of wall means 46 extending in width completely across first channel 23 from inside wall 16 to outside wall 14 and in height from above the level of liquid in reservoir 12 to at least below the level of surface aerator means 20, and wall means 48 extending in height from wall means 46 to the bottom of reservoir 12 and in width from inside wall 16 only as far as partition means 18 extends in the embodiment of FIGS. 1 and 2. In this manner, partition means 18 in this embodiment not only directs the flow of liquid around surface aerator means 20 (in the same fashion as the partition means 18 of the embodiments of FIGS. 1 to 5) but also restricts and simultaneously directs the passage of liquid only below the level of surface aerator means 20, which compels the flow from first channel 23 to merge at an increased speed with the flow below and around surface aerator means 20 where that flow is relatively slower and thereby acts to reduce turbulence and sludge sedimentation and increase pumping and aerating efficiency. Wall means 46 and 48, which comprise partition means 18 in this embodiment, may be integral with each other, if desired, and are potentially structurally stronger than the partition means 18 of FIGS. 1 to 5 since they are supported at both ends.

This invention as been disclosed with respect to certain preferred embodiments and it will be understood that various modifications and variations thereof obvious to those skilled in the art are to be included within the spirit and purview of this application and the scope of the appended claims.

What is claimed is:

1. In a horizontally disposed flowing liquid system in which the liquid changes flow direction from a first channel through a communication section into a second channel, means for simultaneously aerating and circulating said liquid comprising substantially vertical partition means cooperating with surface aerator means, said partition means extending from the inside wall of said first channel into said communication section and said surface aerator means rotating about a substantially vertical axis on the second channel side of said partition means, said axis of said surface aerator means being separated from said partition means at the closest point by a distance corresponding to about 1½ to 2 radii of said surface aerator means and an outer edge of said partition means extending past said closest point no more than a distance corresponding to about 1 said radius, said axis being separated from the closest point of the outside wall of said communication section by a distance corresponding to more than 2 said radii, whereby said aerator means is closer to said partition means than to said outside wall.

2. A system as defined in claim 1 wherein said liquid is waste waster to be treated and wherein said first channel, said second channel, and said communication section comprise a reservoir for said waste water, said reservoir being provided with waste water inlet means and treated liquid outlet means.

3. A system as defined in claim 2 which is an activated sludge continuous waste water treatment system and wherein said treated liquid outlet means is connected to clarifying means which removes at least some of the sludge carried by the treated liquid and sludge return means is provided to return at least some of the removed sludge to said reservoir.

4. A system as defined in claim 3 wherein said reservoir provides a single, closed, continuous, substantially horizontal path.

5. A system as defined in claim 3 wherein said waste water inlet means is loaded in said reservoir such that the distance between said inlet means and said surface aerator means in the flow direction is at least 10% of the distance completely around said reservoir.

6. A system as defined in claim 1 wherein said partition means extends at an angle in the direction of the outer wall of said first channel whereby the flow of said liquid is deflected laterally.

7. A system as defined in claim 6 wherein said partition means is substantially uniplanar.

8. A system as defined in claim 7 wherein said partition means comprises a separation wall provided with an opening therein permitting passage of said liquid from said first channel into said communication section only below the level of said surface aerator means.

9. A system as defined in claim 6 wherein said partition means is arcuate.

10. A system as defined in claim 9 wherein said partition means curves first in the direction of said outer wall and then curves in the direction of said inner wall.

11. A system as defined in claim 6 wherein said partition means comprises segments lying in at least two different planes.

12. A system as defined in claim 1 wherein said surface aerator means comprises aerator impeller means mounted perpendicularly on rotatable shaft means, said shaft means being coaxial with said axis and tilted so that the plane in which said impeller means rotated is non-horizontal.

13. A system as defined in claim 12 wherein said plane slops up and away from said partition means at an angle of up to 10° from the horizontal.

* * * * *